Sept. 30, 1924.
A. A. BACKHAUS
PROCESS OF PURIFYING CARBON DIOXIDE ADVANTAGEOUSLY
Filed May 5, 1924
1,510,373
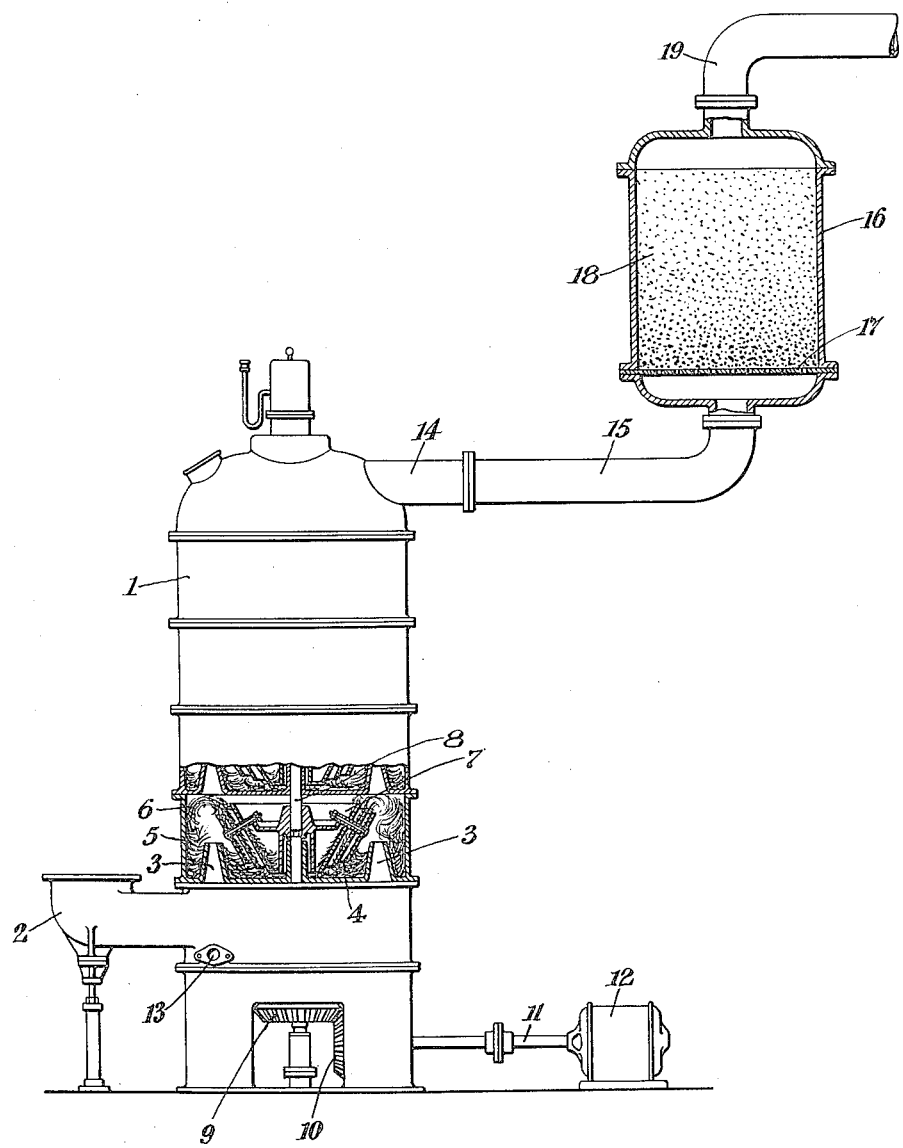
INVENTOR
Arthur A. Backhaus
BY
Spindle, Wright, Neal & Bean
ATTORNEYS Patented Sept. 30, 1924.

1,510,373

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF PURIFYING CARBON DIOXIDE ADVANTAGEOUSLY.

Application filed May 5, 1924. Serial No. 710,975.

*To all whom it may concern:*

Be it known that I, ARTHUR A. BACKHAUS, a citizen of the United States, a resident of Baltimore, State of Maryland, have invented a certain new and useful Improvement in Processes of Purifying Carbon Dioxide Advantageously, of which the following is a specification.

My invention relates particularly to a process for purifying carbon dioxide so that it will be suitable for many different commercial uses.

The object of my invention is to provide a process by means of which carbon dioxide, and especially the carbon dioxide obtained as a by-product in the commercial production of alcohol, may be purified so that the carbon dioxide will be suitable for use in carbonating beverages and also for refrigeration purposes.

Another object of my invention is to remove the odorous constituents of carbon dioxide so that the carbon dioxide can be used in the manufacture of beverages without contamination of the same and without making the said beverages distasteful by the presence of such impurities.

Another object is to remove the aldehydes present so that the carbon dioxide will be suitable for refrigeration purposes owing to the fact that corrosive action due to the presence of the aldehydes is eliminated.

Further objects will appear from the detailed description contained hereinafter.

While my invention is capable of being carried out in many different ways for the purpose of illustration I shall describe only one way of carrying out the same hereinafter and while it is capable of being carried out in connection with many different types of apparatus, I have shown only one type of apparatus for use in connection therewith in the accompanying drawing in which:

The figure is a diagrammatic representation of an apparatus which may be used in connection with my invention.

For example, in carrying out my invention the carbon dioxide which is to be treated in accordance with my invention may be produced in the fermentation of any of the many different materials which are fermented to produce alcohol, as for example, molasses, grains of all kinds, potatoes, etc, and it may contain a number of different impurities including a small percentage of alcohol, a number of odorous constituents, the chemical constitution of which is not completely known, but which comprise probably nitrogen compounds, essential oils, aldehydes and traces of fusel oil. The carbon dioxide thus obtained is first passed through a scrubber 1 to remove the alcohol with which the carbon dioxide is saturated. This scrubber may be of any desired type, but as shown in the drawing, comprises an inlet pipe 2 adapted to deliver the carbon dioxide through a plurality of the tubes 3 to a series of pans 4 carrying a body of water 5 which is formed into an annular spray 6 over each of the pans and over the tubes 3 in said pans by means of inverted frusto-conical members 7 carried upon a shaft 8 rotated by bevel gears 9 and 10 from a driving shaft 11 driven by an electric motor 12. The diluted alcohol contained in the scrubber 1 is conveyed away by a pipe 13 and may be returned to the inlet end of the still used for removing the alcohol from the fermented materials while the carbon dioxide freed from the alcohol passes out by the gas outlet 14. From this point the carbon dioxide is, in the embodiment shown, conveyed by a pipe 15 to an absorbing chamber 16 having a perforated plate 17 in the bottom thereof to support a body of carbon 18. The carbon used for this purpose may be a highly absorptive carbon or charcoal capable of absorbing substantially all the odorous impurities in the carbon dioxide and which is preferably an activated carbon produced by means of any known processes such as a heat treatment or a steam activation process or a chemical treatment to render the carbon activated. As examples of activated carbon may be mentioned cocoanut shell carbon or a carbon produced by carbonizing the shells or pits of many other kinds of nuts and activating them. Activated carbon produced from anthracite coal may be used, the process of manufacture consisting in coking anthracite coal by any of the known coking processes and then subjecting the coke in granular or finely divided form to the action of steam or air at from 700° to 1000° C. for a period of several hours.

The body of carbon 18 removes from the carbon dioxide the odorous constituents and in this way the nitrogen compounds, essential oils, fusel oil, etc., as well as the aldehydes which give an odorous character to the carbon dioxide and which, if present, are unsuited for use in carbonating beverages and for refrigeration purposes, are removed. From this point the carbon dioxide passes out of the absorbing chamber by means of a pipe 19, by which it may be conducted to any suitable point for use in any desired way, as for example, by storage in a gas holder or liquefaction in cylinders in order to use the same in carbonating beverages of various kinds or for refrigeration.

In order to revivify the carbon it may be steamed and dried or removed and heated in the absence of air to a temperature of 600 to 700° C.

It will be understood that in the treatment above described for removing the alcohol and other odorous constituents which are at least partially pleasant smelling and pleasant tasting, if desired, the alcohol and other odorous constituents may be removed only in part so that, where this is found desirable, the carbon dioxide may carry the residual quantities of these foreign substances.

While I have described my invention above in detail I wish it to be understood that many changes may be made therein without departing from the spirit of the same.

I claim:

1. The process which comprises purifying carbon dioxide obtained from fermentation in the production of alcohol by passing it through activated carbon to remove odorous and objectionable impurities therefrom.

2. The process which comprises purifying carbon dioxide obtained from fermentation in the production of alcohol by scrubbing it and then passing it through activated carbon to remove odorous and objectionable impurities therefrom.

3. The process which comprises purifying carbon dioxide obtained from fermentation in the production of alcohol and passing it through activated carbon produced from anthracite coal to remove odorous and objectionable impurities therefrom.

4. The process which comprises purifying carbon dioxide obtained from fermentation in the production of alcohol by scrubbing it and then passing it through activated carbon produced from anthracite coal to remove odorous and objectionable impurities therefrom.

5. The process which comprises purifying carbon dioxide obtained from fermentation of molasses in the production of alcohol by passing it through activated carbon.

6. The process which comprises purifying carbon dioxide obtained from fermentation in the production of alcohol by removing the residual alcohol in passing it through activated carbon.

7. The process which comprises purifying carbon dioxide obtained from fermentation in the production of alcohol by removing the residual alcohol in passing it through activated carbon produced from anthracite coal.

8. The process which comprises purifying carbon dioxide by passing it through activated carbon to remove odorous and objectionable impurities therefrom.

9. The process which comprises purifying carbon dioxide by scrubbing it and then passing it through activated carbon to remove odorous and objectionable impurities therefrom.

10. The process which comprises purifying carbon dioxide and passing it through activated carbon produced from anthracite coal to remove odorous and objectionable impurities therefrom.

11. The process which comprises purifying carbon dioxide by removing the residual alcohol in passing it through activated carbon produced from anthracite coal.

In testimony that I claim the foregoing, I have hereunto set my hand this 3rd day of May, 1924.

ARTHUR A. BACKHAUS.